United States Patent

[11] 3,548,697

| [72] | Inventors | Heinz Joseph Gerber;<br>David R. Pearl, West Hartford, Conn. |
|---|---|---|
| [21] | Appl. No. | 821,723 |
| [22] | Filed | May 5, 1969 |
| [45] | Patented | Dec. 22, 1970 |
| [73] | Assignee | Gerber Garment Technology<br>East Hartford, Conn.<br>a corporation of Connecticut |

[54] APPARATUS FOR CUTTING SHEET MATERIAL
20 Claims, 15 Drawing Figs.

[52] U.S. Cl. .................................................. 83/201.03,
83/422, 83/427, 83/428, 83/437, 83/561, 83/648,
83/658
[51] Int. Cl. .................................................. B26d 1/46,
B26d 1/04
[50] Field of Search .......................................... 83/658,
648, 561, 562, 547, 437, 422, 427, 428, 647,
201.03

[56] References Cited
UNITED STATES PATENTS

| 245,149 | 8/1881 | Fowler .......................... | |
| 2,142,728 | 1/1939 | Kienzle ......................... | 83/659UX |
| 3,170,354 | 2/1965 | Scholl .......................... | 83/659X |
| 3,245,295 | 4/1966 | Mueller. | |
| 3,274,873 | 9/1966 | Sauer ........................... | 83/659X |
| 3,338,125 | 8/1967 | Casey ........................... | 83/659X |

*Primary Examiner*—James M. Meister
*Attorney*—Mc Cormick, Paulding and Huber

ABSTRACT: Apparatus for cutting sheet material includes a cutting table having a penetrable material supporting surface and a bed of penetrable material below such surface. A cutting tool extends through the penetrable surface and into the bed of penetrable material during at least a portion of the cutting process.

PATENTED DEC 22 1970

3,548,697

INVENTORS
HEINZ JOSEPH GERBER
DAVID R. PEARL
BY
McCormick, Paulding & Huber
Attorneys

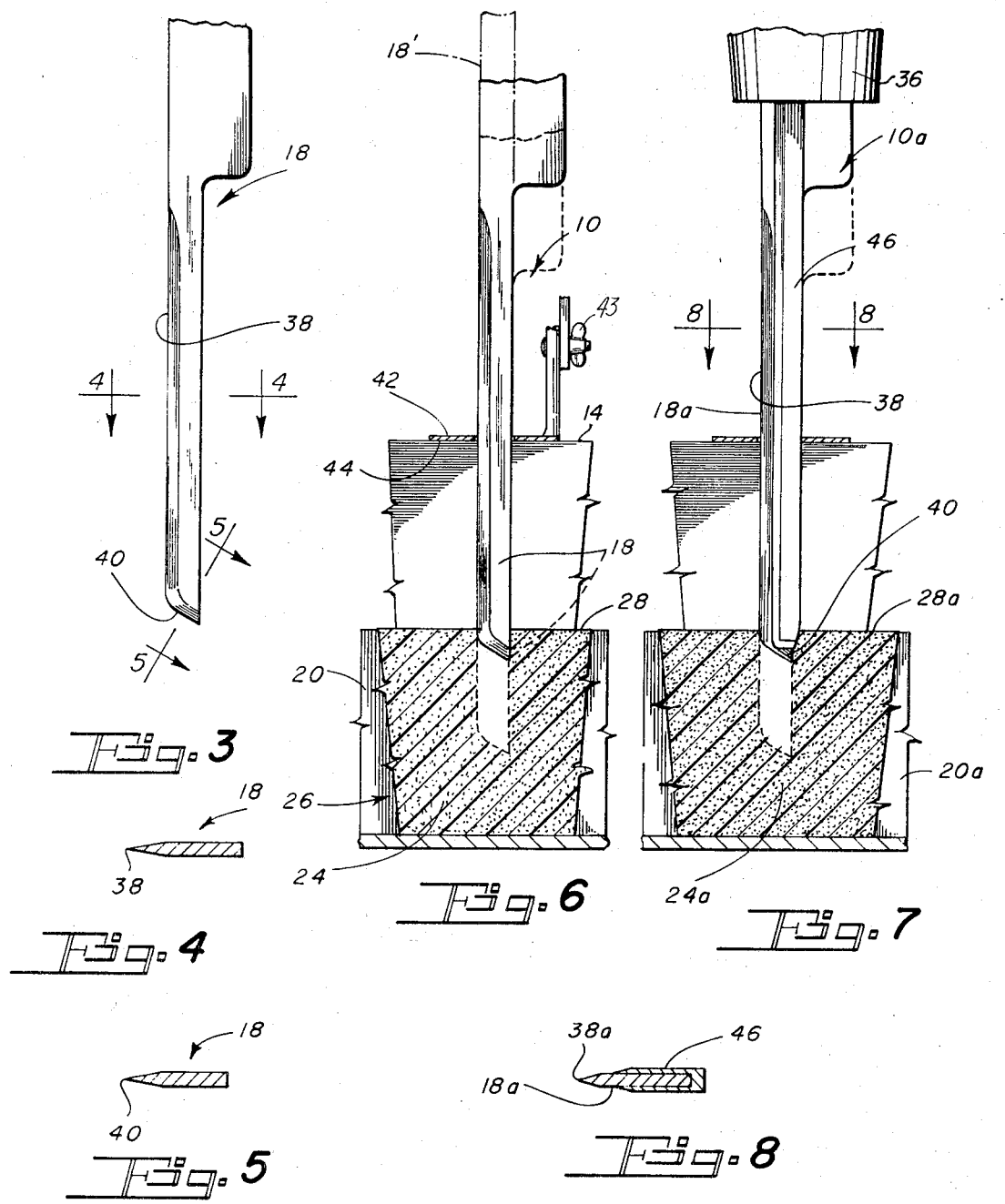

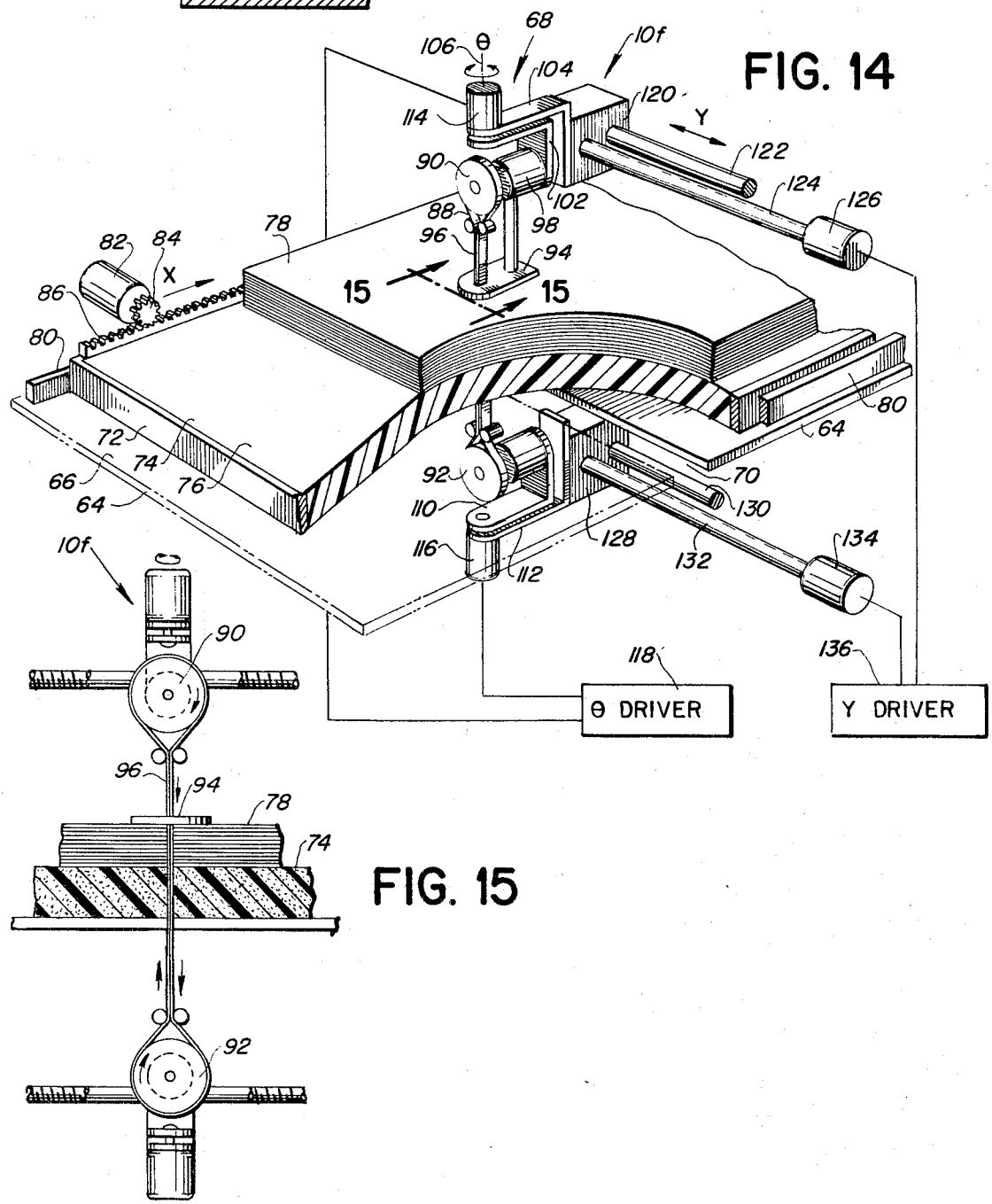

3,548,697

APPARATUS FOR CUTTING SHEET MATERIAL

BACKGROUND OF THE INVENTION

This invention relates generally to sheet material cutting apparatus, and deals more particularly with an improved apparatus particularly well adapted for cutting garment components or the like from either a layup of sheets arranged in vertically stacked relationship or a single sheet which is spread out in a generally flat condition prior to the cutting operation.

The general aim of the present invention is to provide an improved simple and efficient apparatus of the aforedescribed general type which is particularly well adapted to operate automatically in response to control signals supplied by an associated numerically controlled controller, computer or the like.

SUMMARY OF THE INVENTION

The present invention resides in a means for supporting a layup or a single sheet of material to be cut and including a penetrable supporting surface and a bed or penetrable material below such a surface, a cutter with a cutting tool, and means for moving the cutter and support means relative to one another in two coordinate directions to allow the cutting tool to follow any line on the material to be cut. The cutting tool passes through the material and, during at least a portion of the cutting process, penetrates the supporting surface and the bed of penetrable material therebeneath. The cutting tool may among others be one which reciprocates, one which rotates, or one such as an endless band which travels in a continuous manner and passes completely through the bed of penetrable material.

BRIEF DESCRIPTION OF THE DRAWINGS

FIG. 3 is a side elevational view of the blade of the cutting apparatus of FIG. 1.

FIG. 4 is a sectional view taken along the line 4–4 of FIG. 3.

FIG. 5 is a sectional view taken along the line 5–5 of FIG. 3.

FIG. 6 is a somewhat enlarged side elevational view of the apparatus of FIG. 1, shown partially in section.

FIG. 7 is generally similar to FIG. 6 but shows another apparatus embodying the invention.

FIG. 8 is a sectional view taken along the line 8–8 of FIG. 7.

FIG. 13 is a fragmentary sectional view generally similar to FIG. 2 but showing a sheet material cutting apparatus embodying the present invention and employing a different form of cutting tool.

FIG. 14 is a fragmentary perspective view of a sheet material cutting apparatus comprising still another embodiment of the present invention.

FIG. 15 is a fragmentary vertical sectional view taken on the line 15–15 of FIG. 14.

DETAILED DESCRIPTION OF THE PREFERRED EMBODIMENTS

Figure 1:
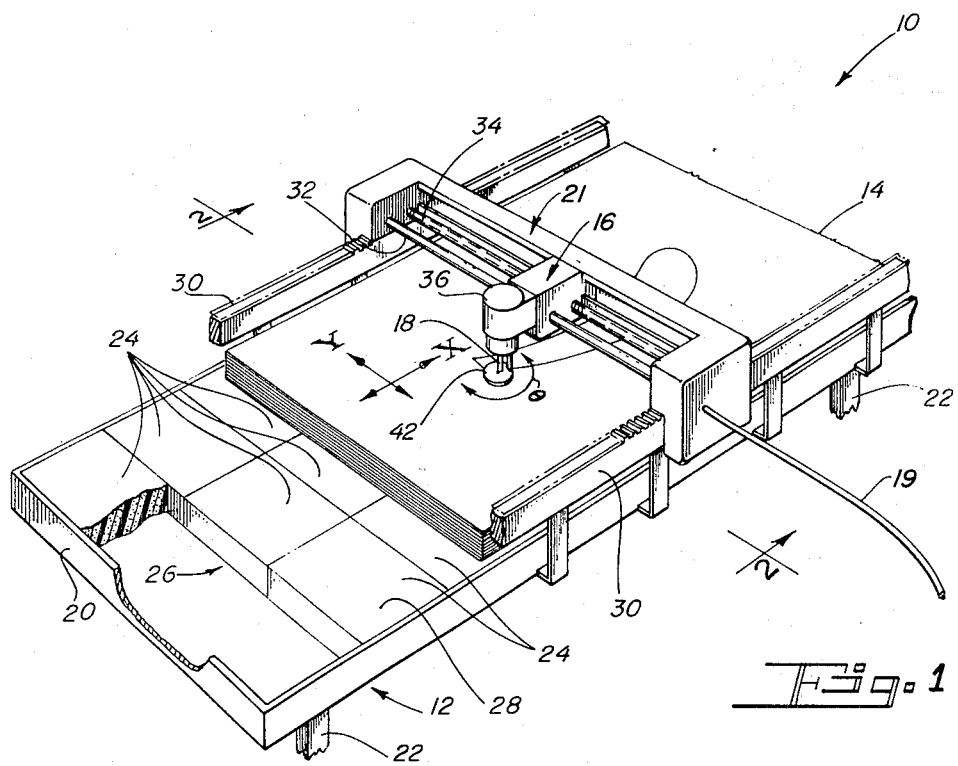
FIG. 1 is a fragmentary perspective view of a sheet material cutting apparatus embodying the present invention.
Figure 2:
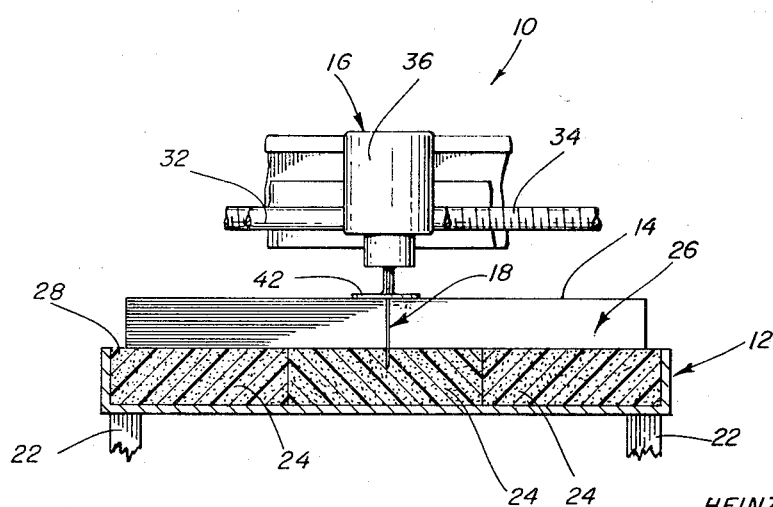
FIG. 2 is a somewhat enlarged fragmentary sectional view taken along the line 2–2 of FIG. 1.

Turning now to the drawings in greater detail, and first considering FIGS. 1 to 6, a sheet material or fabric-cutting apparatus 10 is shown in FIG. 1 as having a table indicated generally at 12 providing support for a fabric layup 14 comprising a plurality of fabric sheets arranged in vertically stacked relation. A carriage indicated generally at 16 is supported by the table for traversing the surface thereof in two coordinate directions as indicated by the arrows X and Y. The apparatus also includes a cutter 36, having a cutting tool in the form of a blade 18, mounted on the carriage 16 so that it can be driven to and from any predetermined point relative to the table surface in response to positioning signals supplied to the apparatus through the cable 19 by an associated input means such as, for example, a numerically controlled controller or a computer (not shown). The carriage is capable of moving the blade 18 in cutting engagement with the layup 14 along any line which may be straight or curved as required in cutting a garment component or the like. The blade 18 has a reciprocating cutting stroke and is further arranged for rotation about its own axis in a direction indicated by the arrow $\Theta$ in response to signals from the input means. During at least a portion of its stroke, the blade 18 penetrates the upper supporting surface 28 of the table 12 as hereinafter described in more detail.

The table may be constructed from various materials and may take a variety of forms, and in the drawings and description which follows various preferred table forms are illustrated and described. The table 12 of FIGS. 1 to 6 includes a containerlike frame 20 supported at a convenient working height by a plurality of legs 22, 22. The frame has a bottom wall and side and end walls which extend upwardly from the bottom wall to form a shallow container for receiving a plurality of pieces, or generally rectangular blocks 24, 24, of resilient penetrable plastic material contiguously arranged to form a bed of material indicated generally at 26. Preferably the blocks are made from foamed polyethylene. Ethafoam, a product of Dow Chemical Company, has proven particularly suitable as a bed material. The upper surfaces of the blocks 24, 24 collectively define the substantially continuous planar surface 28 on which the layup 14 is supported.

The carriage 16 may be supported and driven relative to the table in various different ways without departing from the invention. In the illustrated apparatus of FIG. 1, however, the carriage 16 is carried by a larger main carriage, indicated generally at 21 which transversely spans the table 12. Support for the main carriage 21 is provided by a pair of elongated racks 30, 30 mounted on opposite sides of the table 12 and extending longitudinally thereof. The carriage 21 includes a drive shaft (not shown) which also extends transversely of the table and has pinions mounted at its opposite ends for engaging the racks 30, 30 to move the carriage longitudinally of the table, or in the X direction, in response to operation of a drive motor drivingly connected to the shaft. A guide bar or tube 32 and a lead screw 34 also extend transversely of the table and serve to support and drive the carriage 16 transversely of the table, or in the Y direction, in response to the operation of another drive motor drivingly connected with the lead screw 34. The blade 18 extends downwardly from the main body of the cutter 36 and is reciprocated vertically by a motor in the cutter body. It is also rotated in the $\Theta$ direction by another motor in the cutter body.

The cutter 36 is mounted on the carriage 16 for vertical movement relative thereto so as to be capable of being raised from the position shown in FIG. 1 to elevate the blade 18 and raise it from its normal cutting position to a position at which it is located entirely out of and above the top of the fabric layup 14. That is, when the cutter 36 is raised, the lower extremity of the blade 18 is positioned above the layup 14 so that the cutter and blade may, if desired, be moved to any preselected position above the layup and then lowered to pierce the layup. Thus, a cut may be started at any desired position on the layup and inwardly of the marginal edges thereof. Further, considering the blade 18, as best shown in FIGS. 3 to 6, it will be noted that it has a cutting edge which extends generally longitudinally along the major portion thereof and terminates at the lower extremity thereof. More particularly, the cutting edge includes a rectilinear portion 38 and an end portion 40 inclined downwardly from the rectilinear portion 38 to the rear edge and lower extremity of the blade, as best shown in FIG. 3. The inclined portion 40 serves to cut the material of the layup as the cutter is lowered from its raised position to its normal cutting position with the blade piercing into the layup as such lowering movement is effected.

Preferably the apparatus 10 also includes a presser plate 42 carried by the motor 36 and arranged for adjustable movement generally toward and away from the surface 28 to accommodate layups of various thickness, as best shown in FIG. 6. A thumbscrew 43 releasably retains the presser plate in various desired positions of adjustment. The presser plate 42 has a generally horizontally disposed and downwardly facing bearing surface 44 adapted to press downwardly against the upper surface of the layup 14 as the blade 18 reciprocates through an opening in the presser plate. During at least a portion of its cutting stroke, the blade 18 extends through the surface 28 and penetrates the bed 26. The blade 18 may be adjusted vertically relative to its drive motor 36 to control its depth of penetration.

In FIG. 6, the blade 18 is shown adjusted for the presently preferred form of cutting operation, the solid lines showing the blade in the upper extremity of its stroke and the dotted lines showing the blade in the lower extremity of its stroke. From this FIG., it will be noted that the adjustment is such that the blade tip remains buried in the material of the bed 26 at all times during the normal cutting process and at the lower extremity of its stroke extends slightly more than halfway through the bed. This particular adjustment of the blade is not, however, essential and, if desired, the blade may be adjusted so that more or less of the tip remains buried at all times in the bed material or so that the blade penetrates through more or less than half the thickness of the bed material. Also, the adjustment may in some cases be such that the blade tip actually moves above the top surface of the bed material during a portion of its stroke.

The individual blocks 24, 24 which comprise the bed 26 may ultimately be damaged by repeated blade penetration to the point where it no longer adequately supports the layup. When such damage occurs one or more damaged blocks 24, 24 may be removed from the frame 29, overturned and but includes in the frame to expose an undamaged lower side of each block in an upwardly facing position. After both the upper and lower surfaces of a block 24 have become so damaged that the block no a, provides support for the layup 14, the damaged block may be removed from the frame 20 and replaced by a new one. Thus, it is necessary to replace only that portion of the bed which becomes severely damaged to maintain the apparatus in operating condition.

Additional embodiments of the invention shown in the drawings and hereinafter further described are similar in many respects to the previously described apparatus 10 of FIGS. 1 to 6. Each part which is substantially identical to a part previously described bears the same reference numeral as the previously described part but includes a letter suffix and will not be hereinafter further discussed. Considering now FIGS. 7 and 8, another apparatus 10a is shown which is similar in most respects to the apparatus 10. The apparatus 10a, however, includes an elongated blade sheath 46 which extends longitudinally of the blade 18a and receives an associated portion of the blade therein with the cutting edge of the blade exposed. The sheath 46 is supported at its upper end from the main body of the cutter 36 and in turn provides additional support for the blade 18a which is reciprocally movable therein. Preferably, as shown in FIG. 7, the sheath is so positioned during normal cutting that its lower end slightly penetrates the bed 26.

Figure 9:
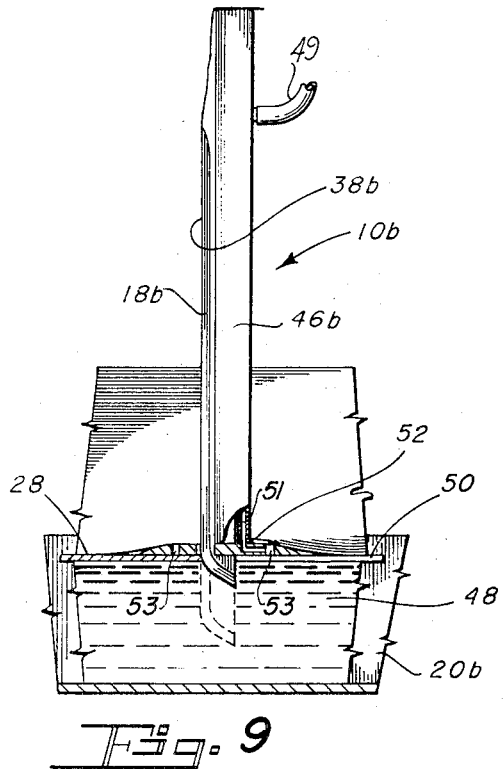
FIG. 9 is generally similar to FIG. 6 but shows a further embodiment of the invention.
Figure 10:
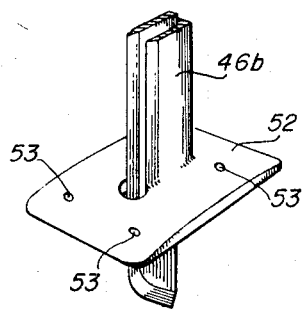
FIG. 10 is a fragmentary perspective view of the apparatus of FIG. 9.

Various other materials besides a foamed plastic such as foamed polyethylene may be used to provide a penetrable supporting bed for the material to be cut and, in some instances, it may be desirable to provide a bed of penetrable material which is substantially immune to damage from repeated blade penetration. In accordance with the present invention such apparatus is indicated at 10b in FIG. 9 and includes a bed of self-healing or self-repairing material. The bed material indicated at 48 is a superviscous liquid, that is, a liquid which exhibits properties of a solid material. A material of this type marketed under the trade name Silly Putty has been found particularly well suited for the present purpose. A substantially continuous penetrable and planar supporting surface is provided by a sheet of material which rests on the upper surface of the liquid 48. The sheet 50 is preferably paper or like material which may be readily discarded and replaced, as necessary. The sheet 50 may not, however, be needed in some instances, depending on the character of the material being cut, and in such cases may be eliminated with the surface of the bed material 48 therefore directly engaging and forming the immediate supporting surface for the material to be cut. The apparatus 10b also includes a blade sheath 46b which has a bottom plate 52 mounted at its lower end. The horizontally disposed bottom plate 52 resides between the sheet 50 and the layup 14b and provides a convenient device for gauging the vertical adjustment of the drive motor 36 relative to the surface 28 to insure proper penetration of the blade in the bed of material 26. Also, if desired, air under pressure may be conducted through the sheath 46b to the bottom plate 52 and emitted from holes or the like in either its top or bottom surface, or both, to provide an air cushion between the bottom plate and the material being cut and/or between the bottom plate and the supporting surface of the supporting bed to reduce the frictional forces on the bottom plate and the supporting surface of the supporting bed to reduce the frictional forces on the bottom plate resisting its movement during a cutting process. For this purpose, as shown in FIGS. 9 and 10, the sheath 46b has an air passageway 51 extending through its rear portion and connected at its upper end to an air supply conduit 49. This passageway 51 communicates with air emitting openings 53, 53 communicating with both the top and bottom surfaces of the illustrated bottom plate 52. The bottom plate 52 is not limited to use with a bed of superviscous material or with a reciprocating cutting tool as shown in FIG. 9, but may be used as well with many other types of bed materials or cutting tools as desired.

While the apparatus 10b has been illustrated and described with reference to a superviscous liquid, it should be understood that other self-healing materials may also be used in practicing the invention. For example, a material which contains capsules of a suitable solvent dispersed therein and adapted to rupture upon contact with a blade will possess this essential self-healing characteristic. A cellular material which has a quantity of a suitable solvent entrapped in some or all of its cells and which solvent becomes chemically active to mend or weld an associated break in the material when the cells are ruptured will also be suitable for this purpose.

Figure 11:
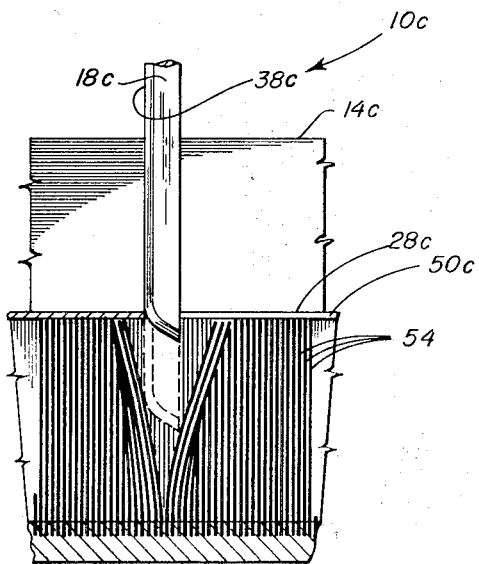
FIG. 11 is generally similar to FIG. 6 but shows still another apparatus embodying the invention.

In FIG. 11, still another apparatus embodying the invention is shown and designated generally at 10c. The apparatus 10c has a bed of penetrable material comprising a plurality of flexible upwardly extending bristles 54, 54. The bristles are arranged in close relation to each other so that in a plane passing transversely of said bristles near their free ends the area occupied by said bristles is greater than the free area surrounding the same. The upper or supporting surface of the table indicated at 28d is defined by a piece of sheet material or paper 50c which overlies the bed surface formed by the free end portions of the bristles 54, 54. Again, however, the sheet 50c may in some instances be eliminated with the upper ends of the bristles 54, 54 in turn collectively defining the supporting surface which immediately contacts the material to be cut.

Figure 12:
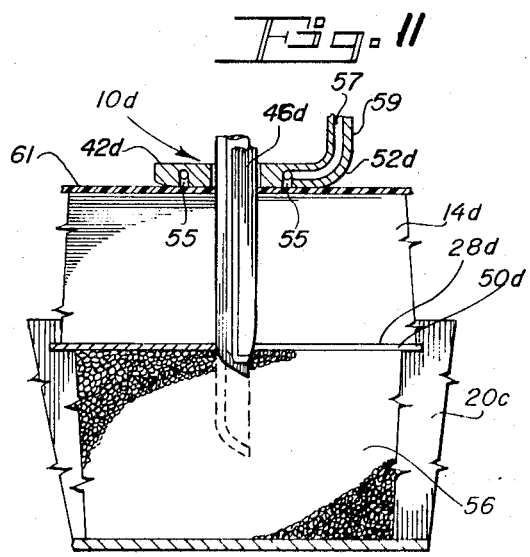
FIG. 12 is generally similar to FIG. 6 but shows a still further embodiment of the invention.

Considering now FIG. 12, still another apparatus embodying the invention, and indicated generally at 10d is shown to comprise a table having a frame 20c containing a bed of granular material indicated generally at 56. Sawdust, small balls of metal or plastic, and granules of foamed or unfoamed plastic are examples of granular material which may be used for that shown at 56. A sheet of material or paper 50d overlies the upper surface of the bed defined by the granular material and provides a substantially continuous planar surface for supporting a layup 14. The apparatus 10d also includes a presser plate 42d and a blade sheath 46d. The presser plate 42d is adjustable vertically relative to the associated cutter housing and applies a pressure to the top surface of the material being cut in the vicinity of the cutting blade. If desired, and as shown in FIG. 11, the presser plate 43d may include one or more openings 55, 55 in its bottom or pressing surface, that is the surface facing the material to be cut, through which air under pressure is supplied from a passageway 57 passing through its associated supporting stem 59. The air under pressure emitted from the openings 55, 55 apply force to the top surface of the material being cut tending to press it more tightly toward the supporting surface of the bed material. It also forms an air cushion between the presser plate and the top surface of the material to reduce friction therebetween. Further, if desired, a sheet 61a of substantially air-impermeable material, such as thin polyethylene film may be spread over the top of the material to be cut so as to reside between the top surface of such material and the adjacent pressing surface of the presser plate, particularly in cases where the material being cut is relatively porous, this permitting the emitted pressurized air to have greater compressing effect on the material being cut.

FIG. 13 shows still another embodiment of the invention consisting of an apparatus indicated generally at 10e. This apparatus 10e is generally similar to that of the apparatus 10 of FIGS. 1 to 6 except for including a rotary cutting element rather than a reciprocating cutting element. More particularly as shown in FIG. 13, the apparatus 10e includes a cutter 58 supported for movement in one coordinate direction by the guide tube 32e and lead screw 34e and for movement in the other coordinate direction by means such as that shown in FIG. 1 for the device 10. The cutter 58 includes a rotary cutting tool 60 which is rotated about its vertical longitudinal axis as indicated by the arrow of FIG. 13 and which is capable of cutting in any direction in which the cutter may be moved relative to the fabric layup 14e. The fabric layup 14e is in turn supported by a bed of penetrable material 24e defining a supporting surface 28e. In use, the rotary cutting tool 60 extends through the fabric layup 14e and penetrates the bed of penetrable material 24e, as shown, so that its lower end is buried in such material.

FIGS. 14 and 15 show still another embodiment of the invention in the form of an apparatus indicated generally at 10f. This apparatus differs from those previously described in that the cutting element of the cutter extends entirely through the bed of penetrable material and in that movement of the cutting element relative to the fabric layup in one coordinate direction is obtained by moving the fabric layup and its supporting bed of penetrable material in such one coordinate direction as the cutting element is held stationary in such coordinate direction.

Considering FIGS. 14 and 15 in more detail, the apparatus 10f there shown consists of a stationary supporting table, comprised of two panels 64, 64 and an associated cutting tool 68. The two panels 64, 64 of the table define a stationary upwardly facing supporting surface 66 and are spaced from one another to form a gap 70 through which the blade of the cutting tool 68 extends. Received on the supporting surface 66 provided by the two panels 64, 64 is a frame 72 housing a bed of penetrable plastic material 74 having an upwardly facing supporting surface 76 which in turn supports the fabric layup 78. The frame 72 and the associated bed of penetrable material 74 is supported for sliding movement in the X coordinate direction over the stationary supporting surface 66 and is guided in such movement by two guide rails 80, 80 fixed to the panels 64, 64 and engageable with opposite sides of the frame 72. In use, the frame 72, the bed 74 and the fabric layup 78 are driven in the X coordinate direction relative to the cutter 68 in order to obtain movement of the fabric layup relative to the cutting blade in the X coordinate direction. Various means may be employed to achieve such movement, but in the illustrated case this means constitutes a motor 82 having a pinion 84 which meshes with a rack 86 fixed to one longitudinal edge of the frame 72 as shown in FIG. 14.

The cutter 68 of the apparatus 10f of FIGS. 14 and 15 is a band blade type of cutter having an endless blade 88 trained around upper and lower pulleys 90 and 92, respectively, so that in the cutting zone the upgoing run of the blade is located directly adjacent to the downgoing run of the blade as shown best in FIG. 15. The blade 88 is sharpened at its forward edge, indicated at 96, and a presser plate 94 which engages the top of the fabric layup 78 is used in association with and surrounds the blade, it being suitably connected to and carried by the housing of the motor 98 which drives the upper pulley 90 to cause operative movement of the blade 88.

As mentioned, the frame 72 and bed 74 of supporting material, together with the fabric layup 78 of the apparatus 10f of FIGS. 14 and 15 is moved in the X direction to obtain movement of the layup 78 in the X coordinate direction relative to the blade 88. In addition, means are also provided to obtain movement of the blade in the Y coordinate direction and about the Θ axis, the Θ axis being the axis 106 of the blade edge 96. These means may take various different forms but in the illustrated apparatus the upper pulley 90 and its associated motor 98 is supported from a bracket 102 which is connected to another bracket 104 for movement about the Θ axis 106. Likewise the bottom pulley 92 is carried by a similar bracket 110 connected to the bracket 112 for movement relative thereto about the same Θ axis. Movement of the bracket 102 relative to the bracket 104 is obtained by a motor 114 and movement of the bracket 110 relative to the bracket 112 is obtained by a motor 116, and both motors 114 and 116 are in turn driven in synchronism by a common driver 118. Therefore, both the brackets 102 and 110 are moved in unison by the motors 114 and 116 to obtain movement of the blade about the Θ axis as required to maintain the blade tangent to the line of cut.

Movement of the cutter 68 in the Y coordinate direction is provided by mounting the upper bracket 104 to the carriage 120 which is supported for movement in the Y direction by a guide bar 122 and driven in such direction by a lead screw 124 rotated by an associated motor 126. Likewise, the bottom bracket 112 is attached to a similar carriage 128 which is supported for movement in the Y direction by a guide bar 130 and driven in such direction by a lead screw 132 rotated by an associated motor 134. The two motors 126 and 134 are in turn driven in unison by a common driver 136. Accordingly, the two carriages 120 and 128 move in unison in the Y direction to provide for relative movement of the blade 88 in the Y coordinate direction as required to follow a desired line of cut.

We claim:

1. An apparatus for cutting sheet material comprising means defining a substantially continuous penetrable supporting surface for supporting sheet material to be cut which sheet material is spread thereover and which supporting surface is of a relatively unyielding but penetrable character such that each point thereof is substantially fixed against movement relative to other points thereof in the plane of said surface and against movement perpendicularly away from the general plane of said surface, a bed of penetrable material adjacent said supporting surface, a cutter, and means for moving said cutter and said bed of penetrable material relative to one another in two coordinate directions in the plane of said supporting surface, said cutter including a cutting tool which during normal cutting of material spread over said supporting surface passes through said spread material and extends into said bed of penetrable material by penetrating through said supporting surface.

2. An apparatus for cutting sheet material as set forth in claim 1 further characterized by said surface defining means comprising said bed of penetrable material.

3. An apparatus for cutting sheet material as set forth in claim 1 further characterized by said surface defining means comprising a piece of sheet material overlying a surface of said bed of penetrable material.

4. An apparatus for cutting sheet material as set forth in claim 1 wherein said bed of penetrable material comprises a bed of foamed plastic.

5. An apparatus for cutting sheet material as set forth in claim 1 further characterized by said bed of penetrable material including a plurality of flexible bristles extending generally perpendicular to said supporting surface, said bristles being so arranged relative to one another and having such diameters so that in a plane passing transversely of said bristles near their free ends the area occupied by said bristles is greater than the free area surrounding the same, and said means defining a supporting surface comprising a relatively thin penetrable sheet of material overlying and supported by said free ends of said bristles.

6. An apparatus for cutting sheet material as set forth in claim 1 further characterized by said bed of penetrable material comprising a bed of self-healing material.

7. An apparatus for cutting sheet material as set forth in claim 6 further characterized by said self-healing material being a superviscous liquid.

8. An apparatus for cutting sheet material as set forth in claim 1 further characterized by said bed of penetrable material comprising a plurality of contiguously arranged individually replaceable blocks of said material.

9. An apparatus for cutting sheet material as set forth in claim 1 further characterized by said cutting tool of said cutter comprising an elongated reciprocating blade extending generally perpendicular to said supporting surface and having a cutting edge extending generally longitudinally thereof.

10. An apparatus for cutting sheet material as set forth in claim 9 further characterized by said cutter including an elongated blade sheath extending longitudinally along a major portion of said blade for receiving and supporting an associated portion of said blade for reciprocating movement therein with said cutting edge exposed.

11. An apparatus for cutting sheet material as set forth in claim 10 further characterized by a bottom plate fixed to said sheath and adapted to move between said supporting surface and the adjacent surface of said material to be cut as said cutter is moved relative to said material.

12. An apparatus for cutting sheet material as set forth in claim 11 further characterized by said bottom plate including at least one opening in one of its top and bottom surfaces and means forming an air passageway communicating with said opening and passing through said sheath for conducting pressurized air to said opening for emission therefrom to reduce the friction forces applied to said bottom plate.

13. An apparatus for cutting sheet material as set forth in claim 1 further characterized by said cutter including a presser plate located near said cutting tool and having a pressing surface facing the exposed surface of said material to be cut for applying a pressing force to said latter material in the vicinity of said tool.

14. An apparatus for cutting sheet material as defined in claim 1 further characterized by means for holding said bed of penetrable material stationary, and said means for moving said cutter and said bed of penetrable material relative to one another comprising means for moving said cutter in two coordinate directions in the plane of said supporting surface relative to said stationary bed of penetrable material.

15. An apparatus for cutting sheet material as defined in claim 1 further characterized by means for holding said cutter stationary in at least one of said two coordinate directions, and said means for moving said cutter and said bed of penetrable material relative to one another in said two coordinate directions in the plane of said supporting surface including means for moving said bed of penetrable material relative to said cutter in said at least one coordinate direction.

16. An apparatus for cutting sheet material as set forth in claim 4 wherein said foamed plastic material is foamed polyethylene.

17. An apparatus for cutting sheet material comprising a bed of foamed plastic material providing a relatively unyielding but penetrable supporting surface for supporting sheet material to be cut which sheet material is spread thereover, a cutter, and means for moving said cutter and said bed of foamed plastic relative to one another in two coordinate directions in the plane of said supporting surface, said cutter including a cutting tool which during normal cutting of the material spread over said supporting surface passes through said spread material and extends into said bed of foamed plastic by penetrating said supporting surface.

18. An apparatus for cutting sheet material as defined in claim 17 further characterized by said foamed plastic material being foamed polyethylene.

19. An apparatus for cutting sheet material as defined in claim 17 further characterized by said cutting tool of said cutter comprising an elongated reciprocating blade having a free end which penetrates said supporting surface during normal cutting of the material spread thereover.

20. An apparatus for cutting sheet material as defined in claim 19 further characterized by said reciprocating blade being so positioned and having such a stroke during normal cutting of the material spread over said supporting surface that said free end thereof remains buried in said bed of foamed plastic throughout the full extend of each of its strokes.

UNITED STATES PATENT OFFICE
CERTIFICATE OF CORRECTION

Patent No. 3,548,697      Dated December 22, 1970

Inventor(s) Heinz Joseph Gerber and David Raymond Pearl

It is certified that error appears in the above-identified patent and that said Letters Patent are hereby corrected as shown below:

Col. 1, line 22, "or" should read --of--.

Col. 3, line 41, "29," should read --20,--.

Col. 3, lines 41 and 42, delete "but in-cludes" and substitute --replaced--.

Col. 3, line 45, "no a," should read --no longer--; following "provides" insert --adequate--.

Col. 4, lines 28 to 30, delete "and the supporting surface of the supporting bed to reduce the frictional forces on the bottom plate".

Col. 5, line 6, "43d" should read --42d--.

Col. 6, line 6, "for ward" should read --forward--

Col. 8, line 46, "extend" should read --extent--

Signed and sealed this 30th day of March 1971.

(SEAL)
Attest:

EDWARD M. FLETCHER
Attesting Officer

WILLIAM E. SCHUYLER,
Commissioner of Patent